United States Patent [19]
Warkentin

[11] 3,765,149
[45] Oct. 16, 1973

[54] SEMIAUTOMATIC TRAY PACKER FOR FRUIT

[76] Inventor: Aaron James Warkentin, 23561 E. Dinuba Ave., Dinuba, Calif.

[22] Filed: June 1, 1971

[21] Appl. No.: 148,391

[52] U.S. Cl.................. 53/160, 53/246, 53/251
[51] Int. Cl..................... B65b 5/10, B65b 35/32
[58] Field of Search.................. 53/160, 246, 251; 198/28

[56] References Cited
UNITED STATES PATENTS

| | | | |
|---|---|---|---|
| 3,572,005 | 3/1971 | Allen et al. | 53/160 |
| 3,225,513 | 12/1965 | Ehe | 53/160 |
| 2,847,809 | 8/1958 | Lindeman et al. | 53/160 |
| 2,581,732 | 1/1952 | Thompson | 198/33 AA |

Primary Examiner—Robert L. Spruill
Attorney—Lyon & Lyon

[57] ABSTRACT

An endless conveyor belt is driven by a variable speed motor to convey empty trays having a plurality of pockets formed therein for the reception and packing of fruit. This conveyor is inclined upwardly from vertical at a small acute angle. A second endless conveyor is arranged to intersect the first conveyor and convey fruit thereto. The second conveyor is tilted to cause fruit thereon to accumulate on one side thereof and a chute is formed in that side and over the first belt. This chute extends downwardly at a small acute angle. The end of the chute terminates close enough to the first belt so that fruit falling off of the chute immediately contacts a previous fruit already in a pocket and is directed into the proper empty pocket.

3 Claims, 6 Drawing Figures

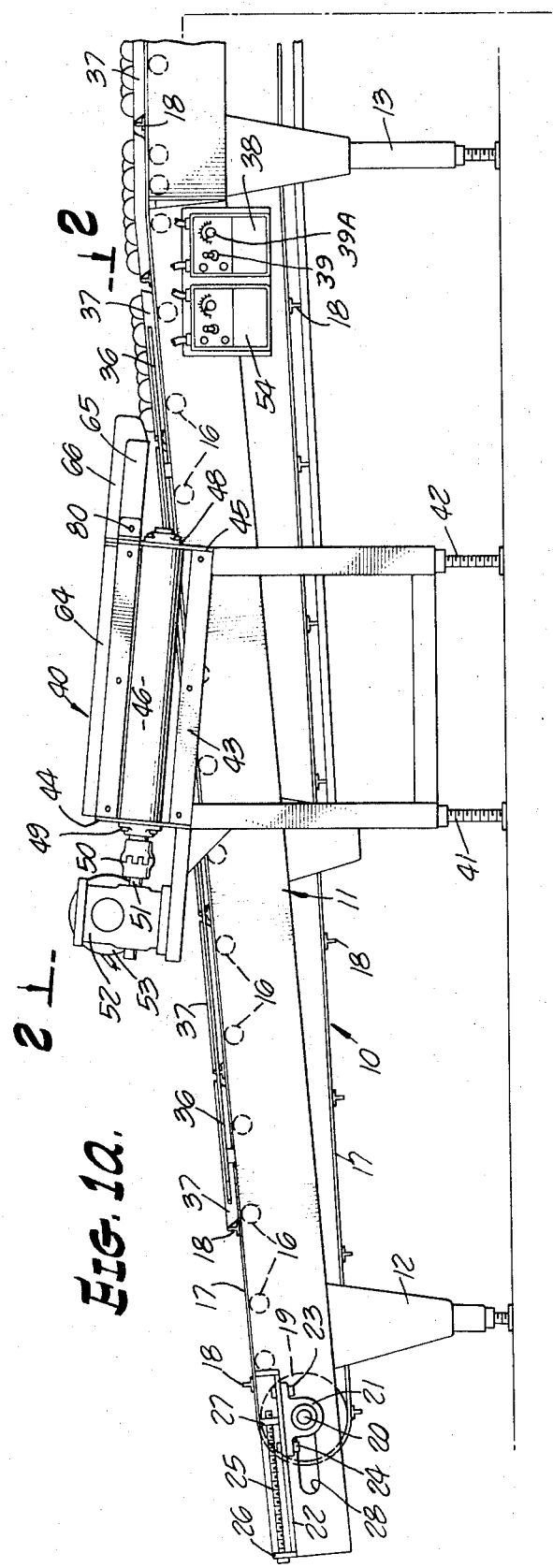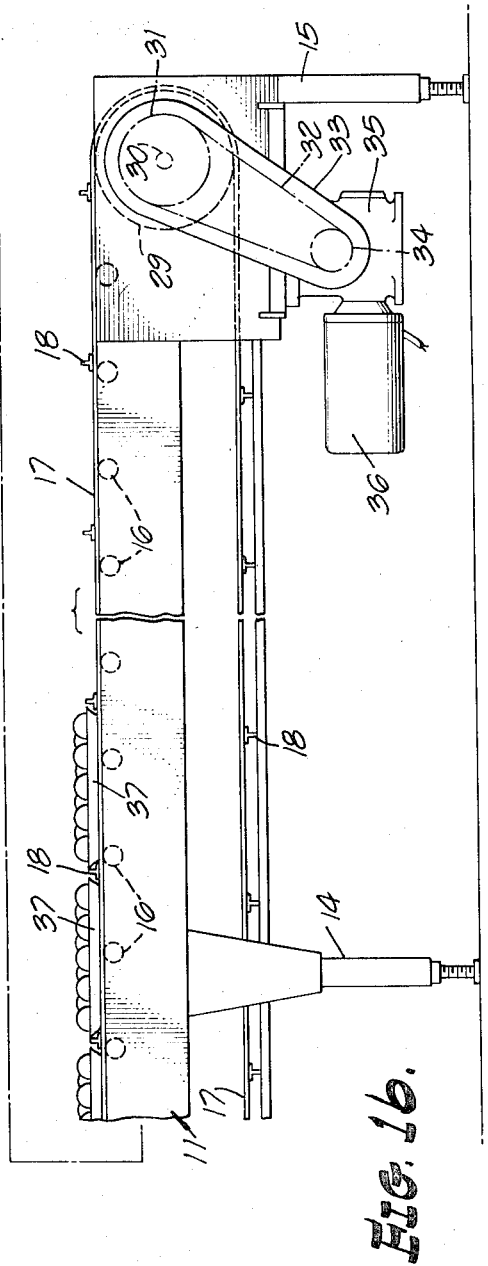

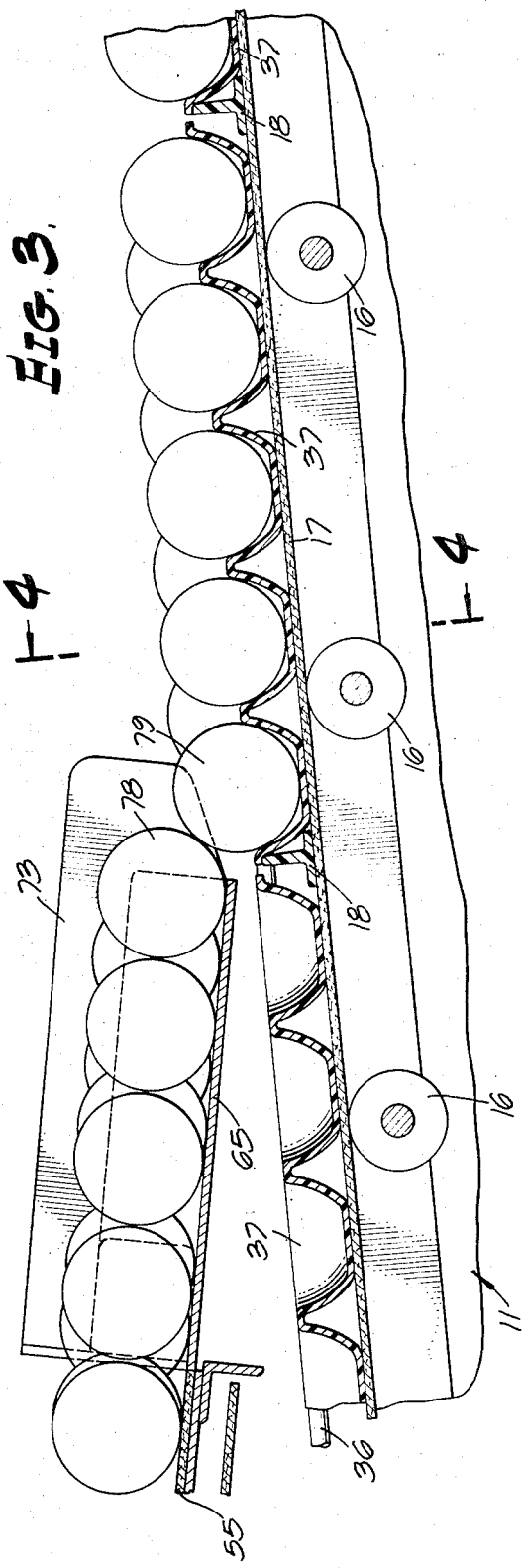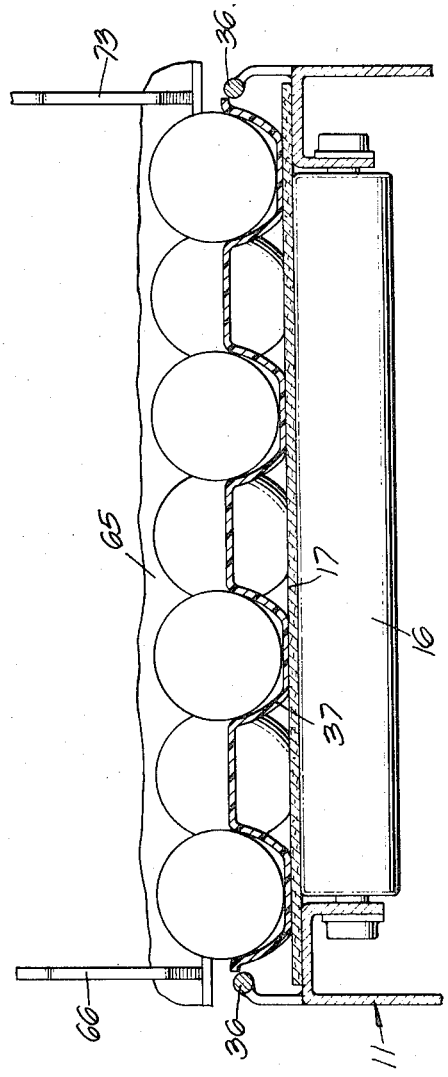

SEMIAUTOMATIC TRAY PACKER FOR FRUIT

This invention relates to a device for packing fruit such as oranges, peaches, plums, tangerines, grapefruit or the like in trays having a series of individual open pockets arranged in rows with each separate pocket filled with an individual piece of fruit. The invention is characterized by the fact that two conveyor belts are employed, one to convey fruit and the other to convey trays, and the fruit is conveyed to the trays at an angle which assures that each piece of fruit as it approaches the tray that it is to occupy engages a piece already in the tray, or a preceding tray, and is indexed thereby into its proper pocket.

The packing of such fruit in such trays is old in the art and various complicated and expensive devices have been proposed to accomplish it. It is accordingly a prime object of this invention to provide a simple, inexpensive and automatic device for packing fruit in such trays.

The packing of such fruit in such trays is more commonly done by hand with a consequent large labor requirement. It is accordingly an object of this invention to replace most of this labor force with a consequent reduction in the cost of packing. Calculations in one packing house in which this invention has been installed show a saving of 8 cents per box of peaches packed.

These and other objects, features and advantages will be apparent from the annexed specification in which FIG. 1 is a side elevation of a device embodying the present invention, presented herein in two parts FIG. 1a and FIG. 1b, FIG. 2 is a plan view taken along the line 2—2 of FIG. 1a;

FIG. 3 is an enlarged partial section taken along the line 3—3 of FIG. 2;

FIG. 4 is a section taken along the line 4—4 of FIG. 3, and

Figure 2:
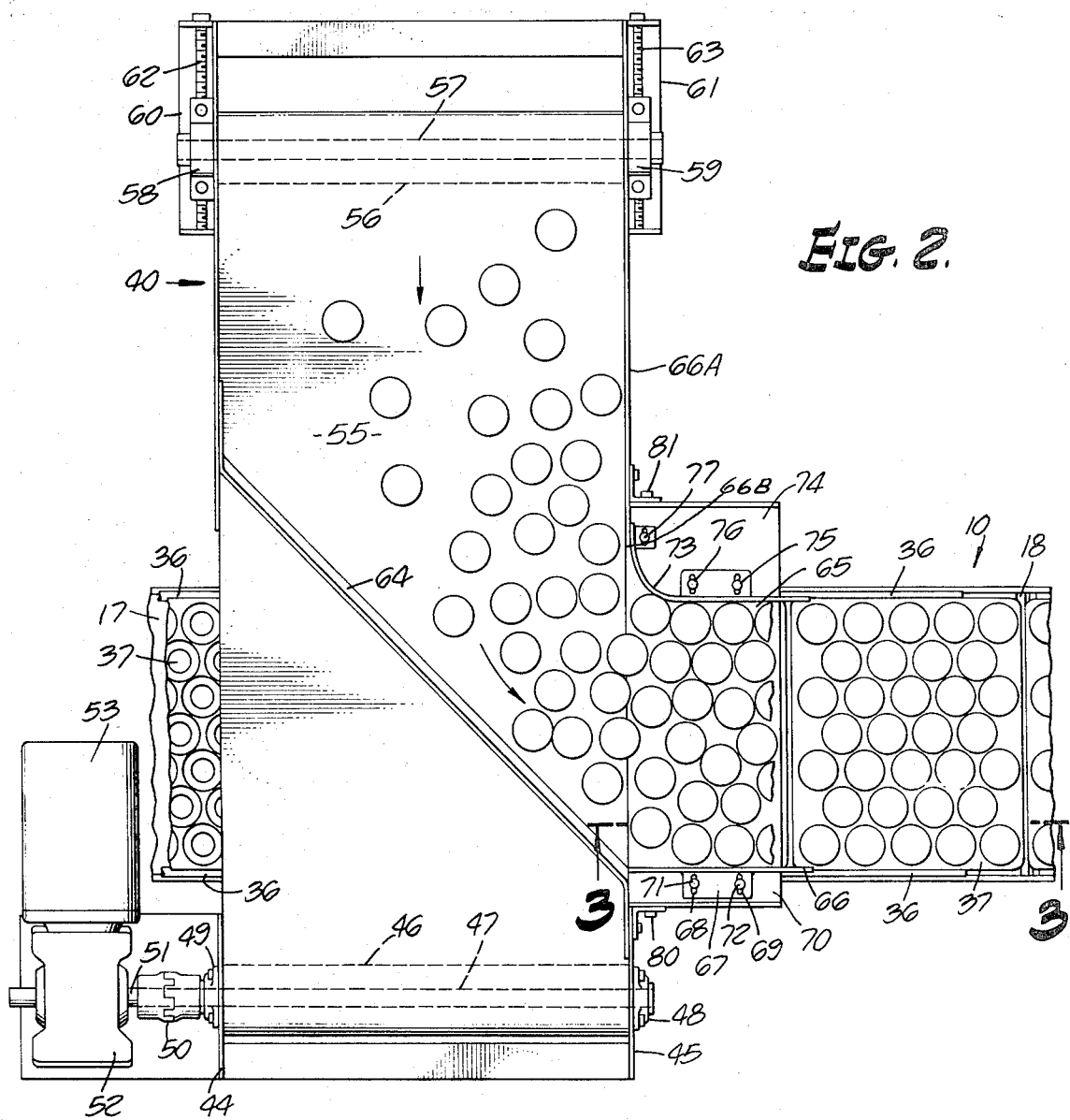

Referring now more particularly to the drawings there is illustrated a conveyor 10 haqing a frame 11 supported by adjustable legs 12, 13, 14 and 15. Journalled in the frame 11 are a plurality of rollers 16 which support the top flite of an endlesss belt 17. The belt 17 is provided with a plurality of spaced cleats 18 extending transversely of the belt 17. The belt 17 passes over a drum 19 mounted on a shaft 20 journalled in a pair of bearings 21 which are adjustably mounted on plates 22 by a pair of bolts 23 and 24 passing through slots (not shown) in plates 22. The adjustment is accomplished by a pair of adjusting screws bearing against end plate 26 and threaded into an upstanding lug 27 which also travels in a slot (not shown) in plate 22 and which is welded to bearing 21. By the means just described the proper tension can be maintained on the belt 17. A slot 28 in each side plate of the frame 11 accommodates movement of the shaft 20.

The frame 11 from its open end until adjacent legs 13 extends upward at an angle of 5° from horizontal but from that point to its other end the frame extends horizontally. Adjacent the rear end of the frame 11 there is mounted a drum 29 which is carried by a shaft 30 which extends through the side plate of the frame and carries a sprocket 31. The sprocket 31 is driven by a chain 32 housed in chain guard 33 and which is in turn driven by a sprocket 34. Sprocket 34 is mounted on a shaft, not shown, extending out of gear reduction box 35. A variable speed electric motor 36 drives gear box 35. Belt 17 extends around and is driven by drum 29.

A pair of rods 36 are affixed to the frame and extend along the path of the belt 17 and serve as guides for the trays 37, centering the trays on the belt 17. A control housing 38 contains an off-on switch 39 and a speed control potentiometer 39A for the motor 36.

A fruit conveyor 40 is arranged to convey fruit to the trays carried by the belt 17 which conveyor includes a pair of adjustable legs 41 and 42. A second pair of adjustable legs (not shown) supports the conveyor 40 but are located on the other side of the conveyor 10. The conveyor 40 has a frame 43 including panels 44 and 45.

A roller 46 is carried by a shaft 47 mounted in bearings 48 and 49 carried by the panels 45 and 44 and by a self-aligning coupling 50 shaft 47 is coupled to shaft 51 which is the output shaft of gear reduction box 52. Gear box 52 is driven by a variable speed electric motor 53. Motor 53 is connected to control housing 54 which likewise contains an off-on switch and a speed control potentiometer for the motor 53. An endless belt 55 passes around the roller 46 and is driven thereby. Belt 55 also passes over a roller 56 carried by a shaft 57 journalled in bearings 58 and 59. Bearings 58 and 59 are mounted on plates 60 and 61 and are moveable by adjusting screws 62 and 63 similarly to bearing 21.

A deflector plate 64 extends diagonally across the conveyor 40 and deflects fruit on the belt 55 to a chute 65. A side rail 66A serves to retain fruit on the belt 55. At one side of the chute 65 a side rail 66 is provided having a flange 67 with a pair of slots 68 and 69 therein for adjustably mounting the side rail 66 on plate 70 by means of adjusting nuts 71 and 72. This arrangement makes the side rail 66 adjustable to accommodate chute 65 to different sized trays. Similarly on the other side of the chute side rail 73 is adjustably mounted on a plate 74 by adjusting means 75, 76 and 77.

Conveyor 40 is tilted as shown in FIG. 1a which causes fruit on belt 55 to move toward side rail 66 and eventually toward chute 65. Chute 65 is also inclined downwardly so that fruit thereon rolls off the end of the chute and drops into a tray passing thereunder. As best seen in FIG. 3, fruit on the chute 65 such as the orange 78 will engage another such as the orange 79, which has already been placed in a pocket in a tray, as it passes off of chute 65 and be directed into an empty pocket.

The space on the tilted belt 55 near the deflector 64 and discharge opening 66B serves to accumulate fruit articles temporarily, when they are being delivered by the tilted belt 55 at a rate faster than flow of fruit articles down the chute 65.

Figure 5:
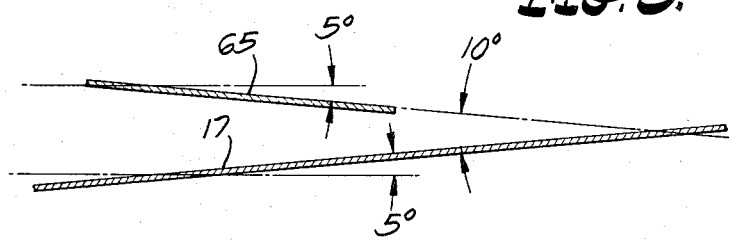
FIG. 5 is a diagram illustrating the angular relation between the fruit conveyor chute and the tray conveyor.

It will be noted that the chute 65 is inclined downwardly and the belt 17 is inclined upwardly. This is illustrated diagramatically in FIG. 5 where it is noted that the included angle between the chute 65 and belt 17 is 10°, each being at an angle of 5° from horizontal. This is the special case for generally round fruit such as oranges and peaches, but the included angle may vary slightly for different cases. Varying of the angle of the chute 65 can be accomplished by loosening the screws 80 and 81 and tilting the plate 74, which forms the bottom of chute 65, about these screws as pivots. Alternatively the angle of the chute 65 can be adjusted by means of adjusting the length of the legs 41 or 42. In either case it may be necessary to move the entire conveyor 40 longitudinally with respect to the conveyor 10 to prevent the chute from interfering with trays 37 on the belt 17 or to prevent the creation of too much space between the chute 65 and belt 17. Conveyor 40 may be moved with respect to conveyor 10 as the electric cord running to control housing (not shown) is the only connection between the two conveyors.

The angle of the belt 17 can be adjusted by means of the adjustable legs 12.

While there has been described what at present is considered the preferred embodiment of the invention it will be appreciated by those skilled in the art that various changes may be made therein without departing from the essence of the invention.

We claim:

1. Apparatus for feeding articles to fill trays, comprising, in combination: an inclined ascending conveyor for carrying the trays, an endless belt to carry the articles having an upper flight traveling in a direction at right angles to the tray conveyor, means for driving the tray conveyor and the endless belt, means supporting said belt flight in a tilted plane so that one edge of the belt flight is lower than the other, a stationary boundary rail along the low edge of said flight and having a discharge opening at the end thereof, a stationary deflector extending angularly across said tilted flight and aligned with one end of said opening, a stationary downward inclined gravity chute having parallel side rails, means for adjusting the inclination of said gravity chute, said gravity chute being positioned above said inclined tray conveyor to discharge articles into trays thereon, said deflector and the angle of tilt of said belt flight cooperating to divert articles from said belt flight adjacent said boundary rail through said opening to fill said gravity chute from side to side between said side rails, the inclination of said gravity chute being small enough so that the flow rate of articles on the gravity chute is automatically regulated by contact of articles leaving the chute with articles previously received in the trays, the space on the tilted belt adjacent said deflector and said discharge opening serving to accumulate articles being delivered to the gravity chute faster than the flow of articles down the chute, and means for adjusting the relative speeds of said tray conveyor and said endless belt.

2. Apparatus as set forth in claim 1 in which the articles to be packed comprise fruit.

3. Apparatus as set forth in claim 1 in which the trays contain pockets for receiving the articles.

* * * * *